United States Patent
Nagata et al.

(10) Patent No.: US 9,647,806 B2
(45) Date of Patent: May 9, 2017

(54) METHOD FOR CONFIGURING COORDINATED MULTIPOINT TRANSMISSION

(75) Inventors: Satoshi Nagata, Tokyo (JP); Jianchi Zhu, Beijing (CN); Mingju Li, Beijing (CN); Xiaoming She, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/112,270

(22) PCT Filed: Apr. 23, 2012

(86) PCT No.: PCT/JP2012/060850
§ 371 (c)(1),
(2), (4) Date: Nov. 11, 2013

(87) PCT Pub. No.: WO2012/144645
PCT Pub. Date: Oct. 26, 2012

(65) Prior Publication Data
US 2014/0057640 A1    Feb. 27, 2014

(30) Foreign Application Priority Data
Apr. 22, 2011   (CN) .......................... 2011 1 0111266

(51) Int. Cl.
*H04W 72/00* (2009.01)
*H04L 5/00* (2006.01)
(Continued)

(52) U.S. Cl.
CPC ........... *H04L 5/0035* (2013.01); *H04B 7/024* (2013.01); *H04L 1/0026* (2013.01);
(Continued)

(58) Field of Classification Search
CPC combination set(s) only.
See application file for complete search history.

(56) References Cited

U.S. PATENT DOCUMENTS

2010/0118805 A1    5/2010  Ishii et al.
2011/0255505 A1*  10/2011  Liu ....................... H04L 5/0007
                                                              370/330
(Continued)

FOREIGN PATENT DOCUMENTS

WO    2007/109630 A1    9/2007
WO    2008/123148 A1   10/2008
WO    2011/043328 A1    4/2011

OTHER PUBLICATIONS

International Search Report for corresponding International Application No. PCT/JP2012/060850, mailed May 22, 2012 (2 pages).
(Continued)

*Primary Examiner* — Idowu O Osifade
(74) *Attorney, Agent, or Firm* — Osha Liang LLP

(57) ABSTRACT

Provided is a method for configuring coordinated multipoint transmission (CoMP) of the present invention. The method includes: providing a transmission mode to support CoMP and, at a base station (eNB), configuring the transmission mode to support CoMP to a user terminal (UE) by radio resource control (RRC) signaling. According to the method of the present invention, it becomes possible to configure CoMP so that the LTE system can support the CoMP function.

10 Claims, 1 Drawing Sheet

(51) Int. Cl.
| | |
|---|---|
| *H04W 72/04* | (2009.01) |
| *H04B 7/024* | (2017.01) |
| *H04L 1/00* | (2006.01) |
| *H04L 1/18* | (2006.01) |
| *H04B 7/06* | (2006.01) |

(52) U.S. Cl.
CPC ........... *H04L 1/1887* (2013.01); *H04W 72/04* (2013.01); *H04B 7/0626* (2013.01)

(56) References Cited

U.S. PATENT DOCUMENTS

| | | | |
|---|---|---|---|
| 2012/0176884 A1* | 7/2012 | Zhang | H04B 7/024 370/203 |
| 2012/0189077 A1* | 7/2012 | Seo | H04B 7/024 375/267 |
| 2012/0218962 A1 | 8/2012 | Kishiyama et al. | |

OTHER PUBLICATIONS

Panasonic; "DCI format design for new transmision schemes"; 3GPP TSG-RAN WG1 Meeting #60, R1-101250; San Francisco, USA; Jan. 22-26, 2010 (5 pages).

Ericsson et al., "Way Forward on the Usage of CSI-RS with transmission mode 9"; 3GPP TSG RAN WG1 #62bis, R1-105818; Xi'an, China; Oct. 11-15, 2010 (2 pages).

3GPP TS 36.213 V10.1.0; "Physical layer procedures (Release 10)"; pp. 23-27; Mar. 30, 2011 (5 pages).

3GPP TS 36.331 V10.1.0; "Radio Resource Control (RRC); Protocol specification (Release 10)"; pp. 160-161; Mar. 30, 2011 (2 pages).

3GPP TS 36.212 V10.1.0; "Multiplexing and channel coding (Release 10)"; pp. 55-71; Mar. 30, 2011 (17 pages).

Office Action issued in corresponding Japanese Application No. 2013-511082, mailed Jun. 16, 2015 (7 pages).

Office Action issued in corresponding Japanese Application No. 2013-511082, mailed Dec. 22, 2015 (8 pages).

Extended Search Report issued in corresponding European Application No. 12774134.6, mailed Mar. 24, 2015 (8 pages).

Alcatel-Lucent Shanghai Bell et al.; "Generic Configuration of DL CoMP Modes"; 3GPP TSG RAN WG1 Meeting #58, R1-093349; Shenzhen, China; Aug. 24-28, 2009 (2 pages).

Office Action issued in corresponding Russian Application No. 2013150604, mailed Nov. 9, 2015 (9 pages).

DRAFT 3GPP TS 36.212 V10.1.0; "3rd Generation Partnership Project; Technical Specification Group Radio Access Network; Evolved Universal Terrestrial Radio Access (E-UTRA); Multiplexing and channel coding (Release 10)"; Mar. 2011 (76 pages).

Office Action issued in corresponding European Application No. 12774134.6, mailed Jul. 4, 2016 (6 pages).

Office Action issued Aug. 23, 2016, in corresponding Japanese Patent Application No. 2013-511082 (with translation) (9 pages).

Office Action issued in the counterpart Chinese Patent Application No. 201110111266.X, mailed Aug. 3, 2016 (13 pages).

* cited by examiner

METHOD FOR CONFIGURING COORDINATED MULTIPOINT TRANSMISSION

TECHNICAL FIELD

The present invention relates to a radio communication technique, and particularly, to a method for configuring coordinated multi-point transmission (CoMP).

BACKGROUND ART

Cellar mobile phones provide an extremely great convenience to communication of the people, and the $2^{nd}$ generation global mobile communication system (GMS: Global System for Mobile Communication) provides further improvement of communication quality in mobile communication by adopting digital communication techniques. The $3^{rd}$ generation partnership project (3GPP) as an important organization in the mobile communication field has extensively promoted standardization of the $3^{rd}$ generation mobile communication technology (3G: The Third Generation) and established a series of communication system standards such as WCDMA (Wide Code Division Multiple Access), HSDPA (High Speed Downlink Packed Access) and HSUPA (High Speed Uplink Packet Access).

In order to address challenges of the wideband access technique and respond to growing demand for new services, the 3GPP has started standardization of the 3G long-term evolution (LTE) since the end of 2004, planning to improve spectrum efficiency and performance of cell-edge users, reduce system delay and provide a higher-speed access service to high-speed mobile users.

CoMP represents joint coordinated transmission at a plurality of transmission points (for example, base stations) which are geographically distant from each other. Now, in order to realize CoMP, there can be adopted the following two architectures. That is, one is called joint processing (JP) and the other is called coordinated scheduling/coordinated beamforming (CS/CB). JP is further divided into two schemes, joint transmission (JT) and fast cell selection (FCS). Specifically, JT represents simultaneous data transmission from a plurality of transmission points to a single user, while FCS represents data transmission from one transmission point to a user.

SUMMARY OF INVENTION

Technical Problem

Now, in the LTE standards Release 8, there are defined 7 transmission modes (TMs). Here, different transmission modes represent different functions such as closed-loop single user multiple-input multiple-output (SU-MIMO), open-loop SU-MIMO, multi-user multiple-input multiple-output (MU-MIMO) and transmission diversity. In LTE Release 9, dynamic switching of SU/MU-MIMO is supported and there is provided a new transmission mode for transmission maximum two data streams per user. In LTE Release 10, dynamic switching of SU/MU-MIMO is supported and there is provided a new transmission mode for transmission maximum 8 data streams per user. In the LTE system, configuring a current transmission mode of each user terminal (UE) is conducted by higher layer signaling. Besides, in the LTE system, quasi-static switching between different transmission modes for each UE is controlled by higher layer signaling. However, as the conventional transmission modes are provided for single point transmission and does not support CoMP, CoMP cannot be configured in the current LTE system, thereby preventing implementation of CoMP.

The present invention was carried out in view of the foregoing and aims to provide a method for configuring CoMP. With this structure, it is possible to set CoMP in the LTE system and thereby to support CoMP in the LTE system.

Solution to Problem

The present invention provides a method for configuring coordinated multipoint transmission (CoMP), the method comprising the steps of: providing a transmission mode to support CoMP; and a base station (eNB) configuring the transmission mode to support CoMP to a user terminal (UE) by radio resource control (RRC) signaling.

The above-described method further comprises: the steps of: at the eNB, after receiving reference signal reception power fed back from the UE, determining a CoMP cooperating set for the UE and notifying the UE of the CoMP cooperating set of the UE and a CSI (channel state information) feedback mode by RRC signaling; at the UE, sending CSI as feedback to the eNB based on the CoMP cooperating set and the CSI feedback mode notified of from the eNB; and at the eNB, performing scheduling based on the CSI fed back from the UE and notifying the UE of a scheduling result.

Here, in the step of providing the transmission mode to support CoMP, conventional transmission modes, Mode 8 and Mode 9, are extended to support CoMP.

Downlink control signaling corresponding to the extended transmission mode, Mode 8, is DCI format 2B.

Downlink control signaling corresponding to the extended transmission mode, Mode 9, is DCI format 2C.

In the step of providing the transmission mode to support CoMP, a first transmission mode is provided to support a coordinated scheduling/coordinated beamforming CoMP scheme and a second transmission mode is provided to support a joint processing CoMP scheme, or a first transmission mode is provided to support both of a coordinated scheduling/coordinated beamforming CoMP scheme and a joint processing CoMP scheme.

In the above-described method, as downlink control signaling corresponding to the first transmission mode or the second transmission mode, DCI format 2B is used as it is, or DCI format 2B is extended to include a multi-user information field of 1 to 3 bits indicating information of UE to attend to joint scheduling and the extended DCI format 2B is used as downlink control signaling corresponding to the first transmission mode or the second transmission mode. Or, as downlink control signaling corresponding to the first transmission mode or the second transmission mode, DCI format 2C is used as it is, or DCI format 2C is extended to include a multi-user information field of 1 to 7 bits indicating information of UE to attend to joint scheduling and the extended DCI format 2C is used as downlink control signaling corresponding to the first transmission mode or the second transmission mode. Or, DCI format 2C is changed to have a MIMO information field reduced from 3 bits to 2 bits and the changed DCI format 2C is used as downlink control signaling corresponding to the first transmission mode or the second transmission mode, or DCI format 2C is changed to have a MIMO information field reduced from 3 bits to 2 bits and to include a multi-user information field of 1 to 7 bits indicating information of UE to attend to joint scheduling, and the changed DCI format 2C is used as downlink control signaling corresponding to the first transmission mode or the second transmission mode. Or, conventional DCI format 1B is changed to remove a TPMI field and a PMI field therefrom and the changed DCI format 1B is used as downlink control signaling corresponding to the first transmission mode or the second transmission mode.

Advantageous Effects of Invention

As is clear from the above, according to the above-described method, the transmission mode is provided to support CoMP and the transmission mode to support CoMP is configured for a UE by RRC signaling. With this structure, it is possible to realize configuring CoMP and to support the CoMP function in the LTE system.

DESCRIPTION OF EMBODIMENTS

With reference to the drawings and by way of examples, an objective, solving means and merits of the present invention will be described in detail below.

Figure 1:
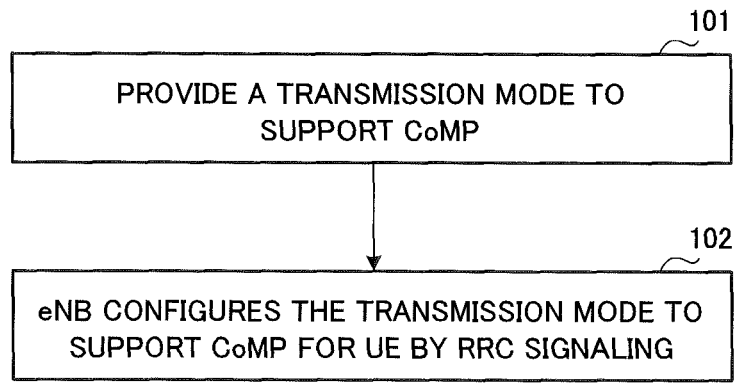
FIG. 1 is a flowchart of a method for configuring CoMP according to an embodiment of the present invention.

In an embodiment of the present invention, there is provided a method for configuring CoMP so that the LTE system can support CoMP. As illustrated in FIG. 1, this method mainly has the following steps.

In the step 101, a transmission mode to support CoMP is provided.

In the step 102, a base station (eNB) at the LTE access network side configures the transmission mode to support CoMP for a UE by RRC (Radio Resource Control) signaling.

Figure 2:
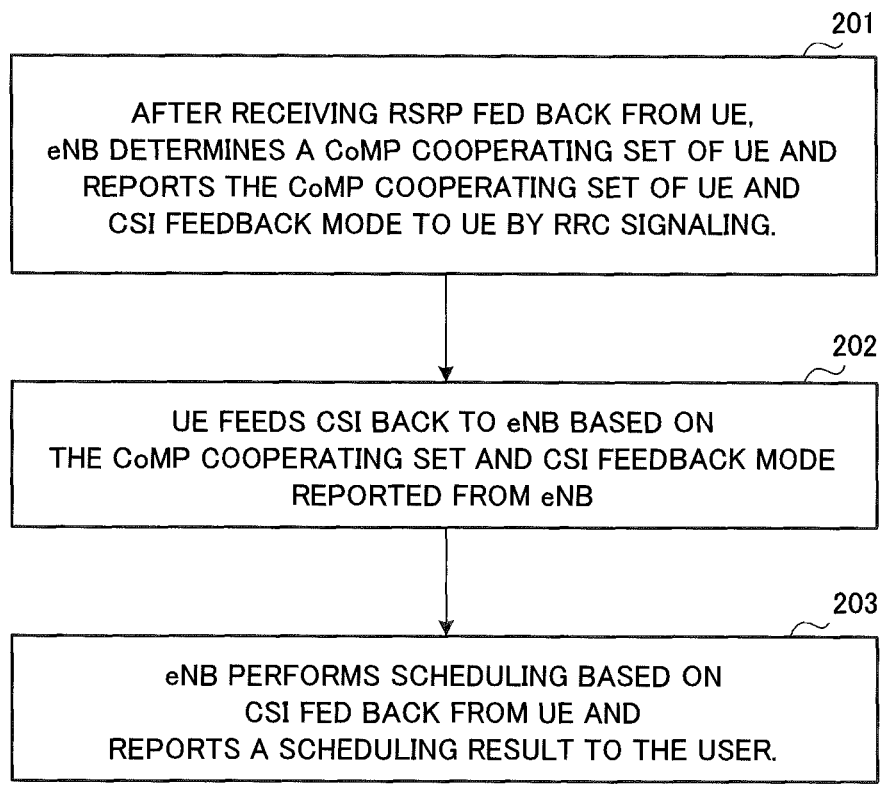
FIG. 2 is a flowchart of a specific method for configuring CoMP according to the embodiment of the present invention.

As illustrated in FIG. 2, after that the eNB configures the transmission mode to support CoMP at the UE, CoMP configuring may be concretely realized by the following steps.

In the step 201, after receiving reference signal receiving power (RSRP) given as feedback from the UE, the eNB determines a CoMP cooperating set for the UE and notifies the UE of the CoMP cooperating set of the UE and a feedback mode of channel state information (CSI) by RRC signaling.

In this step, the eNB may determine the CoMP cooperating set for the UE by using any conventional method or any of all new methods that will be available in future.

Besides, in this step, in order to notify the UE of the CoMP cooperating set for the UE and the CSI feedback mode, channel quality information report configuring message (CQI-ReportConfig) in RRC signaling may be extended to associate the CoMP cooperating set for the UE with the CSI feedback mode. In this way, the eNB can notify the UE of the CoMP cooperating set of the UE and the CSI feedback mode using CQI-ReportConfig in RRC signaling.

In the step 202, the UE sends CSI as feedback to the eNB based on the CoMP cooperating set and CSI feedback mode notified of from the eNB.

In the step 203, the eNB uses the CSI fed back from the UE as a basis to perform scheduling and notifies the user of a scheduling result. In other words, the eNB determines whether the UE employs the CS/CB CoMP transmission scheme or the JP CoMP transmission scheme and notifies the UE of a determination result.

In this step, the eNB may perform scheduling by using any conventional method or any of all new methods that will be available in future.

In order to realize the above-mentioned step 101, in the embodiment of the present invention, there are provided a plurality of methods for providing the transmission mode to support CoMP.

Besides, in the various transmission modes, the eNB needs to configure various related information for data reception (for example, UE modulation and coding scheme (MCS), resources allocated to the UE and so on) to the UE by downlink control signaling. In order to meet this need, in the embodiment of the present invention, it is necessary to provide, in addition to the transmission mode to support CoMP, downlink control signaling corresponding to this transmission mode. Specifically, providing the downlink control signaling corresponding to the transmission mode means providing downlink control information (DCI) format corresponding to the transmission mode.

Next description is made in detail about various methods for providing the transmission mode to support CoMP and the corresponding DCI format, by way of specific examples.

Method 1:

Conventional transmission modes, Mode 8 and Mode 9, are extended so that extended transmission modes, Mode 8 and Mode 9, can support CoMP. The extended transmission modes, Mode 8 and Mode 9 are defined as shown in the following tables 1 and 2.

TABLE 1

| Transmission mode | DCI format | | Description |
|---|---|---|---|
| Mode 8 | DCI format 1A | It exist in a common search space and a UE-specific search space and is scrambled by UE C-RNTI (Common and UE specific by C-RNTI). | When the number of PBCH antenna ports is 1, it means a single antenna port and the port 0 is used. When the number of PBCH antenna ports is not 1, transmission diversity is employed. |
| | DCI format 2B | It exist in a UE-specific search space and is scrambled by UE C-RNTI. (UE specific by C-RNTI) | Dual data stream transmission is adopted, the ports 7 and 8 are used, or the single antenna port is adopted, the ports 7 and 8 are used, and CoMP (e.g., CS/CB, JP) is supported. |

TABLE 2

| Transmission mode | DCI format | | Description |
|---|---|---|---|
| Mode 9 | DCI format 1A | Common and UE specific by C-RNTI | When the number of PBCH antenna ports is 1, it means a single antenna port and the port 0 is used. When the number of PBCH antenna ports is not 1, transmission diversity is employed. |

TABLE 2-continued

| Transmission mode | DCI format | | Description |
|---|---|---|---|
| | DCI format 2C | UE specific by C-RNTI | SU/MU dynamic switching is allowed, SU high data stream number is supported and CoMP (e.g., CS/CB, JP) is supported. |

As is clear from the table 1, the extended transmission mode 8 can support CoMP and its corresponding downlink control signaling is DCI format 2B. Specifically, the LTE access network side can directly use the conventional DCI format 2B as downlink control signaling corresponding to the extended transmission mode 8.

Also, as is clear from the table 2, the extended transmission mode 9 can support CoMP and its corresponding downlink control signaling is DCI format 2C. Specifically, the LTE access network side can directly use the conventional DCI format 2C as downlink control signaling corresponding to the extended transmission mode 9.

By using this above-mentioned method, it is possible to provide the transmission mode to support CoMP and its corresponding downlink control signaling. That is, the step 101 can be realized by this method. In this case, in the step 102, the eNB may configure which to perform single-point CSI feedback or multi-point CSI feedback for a user by RRC signaling. The eNB can choose the single-point transmission or the multi-point transmission after receiving CSI given as feedback from the UE, but there is no need to notify the UE. That is, the above-mentioned method is able to support dynamic switching between the single-point transmission and the multi-point transmission.

Method 2:

New first and second transmission modes are established corresponding to the two CoMP, that is, CS/CB and JP, new downlink control signaling is provided corresponding to each of the first and second transmission modes, thereby to support CoMP. Note that the new first transmission mode, Mode 10, and the new second transmission mode, Mode 11, are defined as shown in the following table 3. As a matter to be explained, in the embodiment of the present invention, the downlink control signaling corresponding to the first and second transmission modes is called DCI format 2D/2E, for convenience of explanation.

TABLE 3

| Transmission mode | DCI format | | Description |
|---|---|---|---|
| Mode 10 | DCI format 1A | Common and UE specific by C-RNTI | When the number of PBCH antenna ports is 1, it means a single antenna port and the port 0 is used. When the number of PBCH antenna ports is not 1, transmission diversity is employed. |
| | DCI format 2D | UE specific by C-RNTI | CS/CB |
| Mode 11 | DCI format 1A | Common and UE specific by C-RNTI | When the number of PBCH antenna ports is 1, it means a single antenna port and the port 0 is used. When the number of PBCH antenna ports is not |

TABLE 3-continued

| Transmission mode | DCI format | | Description |
|---|---|---|---|
| | | | 1, transmission diversity is employed. |
| | DCI format 2D/2E | UE specific by C-RNTI | JP |

As is clear from the table 3, the newly-provided first transmission mode, Mode 10, supports the CoMP CS/CB scheme and its corresponding DCI format is a new DCI format 2D. The newly-provided second transmission mode, Mode 11, supports the CoMP JP scheme and its corresponding DCI format is a new DCI format 2D/2E.

Specifically, in this embodiment of the present invention, the new DCI format 2D/2E may be configured by using any of a plurality of methods, which are explained below:

1) Use, as the DCI format 2D/2E, the DCI format 2B as it is.
2) Add, to the DCI format 2B, a multi-user information field of, for example, 1 to 3 bits indicating information of UE to attend to the joint scheduling (for example, demodulation reference signal (DMRS) port information of UE to attend to joint scheduling, length of orthogonal cover code (OCC) or DMRS port total number, DMRS density etc.) thereby to extend the DCI format 2B and to use the extended DCI format 2B as the DCI format 2D/2E. Its specific configuration is shown in the following table 4.

TABLE 4

| Field | Length (bit) |
|---|---|
| Resource allocation header | 0 or 1 |
| Resource block assignment | |
| TPC command for PUCCH | 2 |
| Downlink Assignment Index | 2 |
| HARQ process number | 3 or 4 |
| TB1 MCS | 5 |
| TB1 NDI | 1 |
| TB1 RV | 2 |
| TB2 MCS | 5 |
| TB2 NDI | 1 |
| TB2 RV | 2 |
| Multi-user information field | 1-3 |

3) Use, as the DCI format 2D/2E, the DCI format 2C as it is.
4) Add, to the DCI format 2C, a multi-user information field of, for example, 1 to 7 bits indicating information of UE to attend to joint scheduling thereby to extend the DCI format 2C and use the extended DCI format 2C as the DCI format 2D/2E. Its specific configuration is shown in the following table 5.

TABLE 5

| Field | Length (bit) |
|---|---|
| Resource allocation header | 1 or 0 |
| Resource block assignment | |
| TPC command for PUCCH | 2 |
| Downlink Assignment Index | 2 |
| HARQ process number | 3 or 4 |
| TB1 MCS | 5 |
| TB1 NDI | 1 |
| TB1 RV | 2 |
| TB2 MCS | 5 |
| TB2 NDI | 1 |

TABLE 5-continued

| Field | Length (bit) |
| --- | --- |
| TB2 RV | 2 |
| MIMO information field | 3 |
| Multi-user information field | 1-7 |

5) Change the DCI format 2C to reduce the number of bits of the MIMO information field indicating information of demodulation reference signal (DMRS) port, scrambling sequence index (SCID), the number of data streams (rank) of UE and so on, from 3 bits to 2 bits and thereby use the changed DCI format 2C as the DCI format 2D/2E. Its specific configuration is shown in the following table 6.

TABLE 6

| Field | Length (bit) |
| --- | --- |
| Resource allocation header | 1 or 0 |
| Resource block assignment | |
| TPC command for PUCCH | 2 |
| Downlink Assignment Index | 2 |
| HARQ process number | 3 or 4 |
| TB1 MCS | 5 |
| TB1 NDI | 1 |
| TB1 RV | 2 |
| TB2 MCS | 5 |
| TB2 NDI | 1 |
| TB2 RV | 2 |
| MIMO information field | 2 |

6) Change the DCI format 2C to reduce the number of bits of the MIMO information field bits indicating information of DMRS port, SCID, UE rank and so on, from 3 bits to 2 bits, and to add a multi-user information field of, for example, 1 to 7 bits indicating information of UE to attend to joint scheduling and thereby use the changed DCI format 2C as the DCI format 2D/2E. Its specific configuration is shown in the following table 7.

TABLE 7

| Field | Length (bit) |
| --- | --- |
| Resource allocation header | 1 or 0 |
| Resource block assignment | |
| TPC command for PUCCH | 2 |
| Downlink Assignment Index | 2 |
| HARQ process number | 3 or 4 |
| TB1 MCS | 5 |
| TB1 NDI | 1 |
| TB1 RV | 2 |
| TB2 MCS | 5 |
| TB2 NDI | 1 |
| TB2 RV | 2 |
| MIMO information field | 2 |
| Multi-user information field | 1-7 |

7) Remove the precoding index (TPMI) field and the precoding type index (PMI) field from the conventional DCI format 1B and thereby use the changed DCI format 1B as the DCI format 2D/2E. Its specific configuration is shown in the following table 8.

TABLE 8

| Field | Length (bit) |
| --- | --- |
| Localized/Distributed VRB assignment flag | 1 |
| Resource block assignment | |
| MCS | 5 |

TABLE 8-continued

| Field | Length (bit) |
| --- | --- |
| HARQ process number | 3 or 4 |
| NDI | 1 |
| RV | 2 |
| TPC command for PUCCH | 2 |
| Downlink Assignment Index | 2 |

8) Further shorten the DCI format 1B and add an additional limit thereto. For example, it is required to allocate resources in a consecutive manner.

In the above-mentioned methods, after receiving the CSI fed back from the UE, the eNB can determine the single-point transmission or multi-point transmission. However, it is not necessary to notify the UE about which transmission is selected. In other words, the above-mentioned methods support dynamic switching between the single-point transmission and multi-point transmission.

Method 3:

A unified transmission mode for CS/CB and JP, that is, the first transmission mode, Mode 10, is provided and a new DCI format is provided thereby to support CoMP. This method aims to optimize the performance of CS/CB and user's feedback is provided to support CS/CB accordingly. The eNB can select from the single-point transmission, multi-point transmission CS/CB and JP, however, there is no need to notify the UE about which is selected between the single-point transmission and the multi-point transmission. That is, the above-mentioned method supports the dynamic switching between the single-point transmission and the multi-point transmission. The newly-provided first transmission mode, Mode 10, is defined as shown in the following table 9.

TABLE 9

| Transmission mode | DCI format | | Description |
| --- | --- | --- | --- |
| Mode 10 | DCI format 1A | Common and UE specific by C-RNTI | When the number of PBCH antenna ports is 1, it means a single antenna port and the port 0 is used. When the number of PBCH antenna ports is not 1, transmission diversity is employed. |
| | DCI format 2D | UE specific by C-RNTI | CS/CB (JP) |

As is clear from the table 9, the newly-provided first transmission mode, Mode 10, supports the CoMP CS/CB (JP) scheme and its corresponding downlink control signaling is a new DCI format-DCI format 2D. As described above, the new DCI format 2D may be configured by using any of a plurality of methods including the methods 1) to 7) described above.

Method 4:

A unified transmission mode for CS/CB and JP, that is, the first transmission mode, Mode 10, is provided and a new DCI format is provided thereby to support CoMP. This method aims to optimize the performance of JP and user's feedback is provided to support CS/CB accordingly. The base station can select from the single-point transmission, multi-point transmission CS/CB and JP, however, there is no need to notify the UE about which is selected between the single-point transmission and the multi-point transmission.

That is, the above-mentioned method supports the dynamic switching between the single-point transmission and the multi-point transmission. The newly-provided first transmission mode, Mode 10, is defined as shown in the following table 10.

TABLE 10

| Transmission mode | DCI format | | Description |
|---|---|---|---|
| Mode 10 | DCI format 1A | Common and UE specific by C-RNTI | When the number of PBCH antenna ports is 1, it means a single antenna port and the port 0 is used. When the number of PBCH antenna ports is not 1, transmission diversity is employed. |
| | DCI format 2D | UE specific by C-RNTI | JP (CS/CB) |

As is clear from the table 10, the newly-provided first transmission mode, Mode 10, supports the CoMP JP (CS/CB) scheme and its corresponding downlink control signaling is a new DCI format-DCI format 2D. As described above, the new DCI format 2D may be configured by using any of a plurality of methods including the methods 1) to 7) described above.

As described above, as the transmission mode to support CoMP may be provided by any one of the above-mentioned methods 1 to 4, it is possible to configure the CoMP so that the LTE system can support the CoMP function. Further, by using any one of the above-mentioned methods 1 to 4, it is also possible to provide a DCI format for downlink control signaling corresponding to the transmission mode to support CoMP. Furthermore, by using the provided downlink control signaling, it is possible for the eNB to transmit, to the UE, necessary information for receiving downlink data. With this structure, the UE is able to receive the downlink data properly.

The preferable embodiments of the present invention described up to this point have been provided for illustrative purposes only and are not intended to limit the scope of protection of the present invention. It should be noted that various modifications, equivalent replacement and improvements made in the spirit and principle of the present invention all fall within the scope of protection of the present invention.

The disclosure of Chinese Patent Application No. 201110111266.X, filed on Apr. 22, 2011, including the specification, drawings, and abstract, is incorporated herein by reference in its entirety.

The invention claimed is:

1. A method for configuring coordinated multipoint transmission (CoMP), the method comprising the steps of:
at a base station (eNB), notifying a user terminal (UE) of a transmission mode to support CoMP and information of UE to attend to CoMP by radio resource control (RRC) signaling,
wherein the transmission mode to support CoMP is Transmission Mode 10 and, a downlink control information (DCI) format corresponding to the Transmission Mode 10 comprises DCI format 2D.

2. The method of claim 1, wherein the DCI format 2D is arranged in a UE specific search space based on C-RNTL.

3. The method of claim 1, further comprising the steps of:
at the eNB, notifying the UE of a channel state information (CSI) feedback mode; and
at the UE, sending CSI as feedback to the eNB based on the transmission mode and the CSI feedback mode.

4. The method of claim 2, further comprising the steps of:
at the eNB, notifying the UE of a channel state information (CSI) feedback mode; and
at the UE, sending CSI as feedback to the eNB based on the transmission mode and the CSI feedback mode.

5. The method of claim 1, wherein the information of UE to attend to CoMP is information relating to a reference signal necessary for data demodulation.

6. The method of claim 2, wherein the information of UE to attend to CoMP is information relating to a reference signal necessary for data demodulation.

7. The method of claim 3, wherein the information of UE to attend to CoMP is information relating to a reference signal necessary for data demodulation.

8. A base station used to configure coordinated multipoint transmission (CoMP),
wherein the base station notifies a user terminal (UE) of a transmission mode to support CoMP and information of UE to attend to CoMP by radio resource control (RRC) signaling, and
wherein the transmission mode to support CoMP is Transmission Mode 10 and a downlink control information (DCI) Format corresponding to the Transmission Mode 10 comprises DCI format 2D.

9. A user terminal used to configure coordinated multi-point transmission (CoMP),
wherein the user terminal configures a transmission mode to support CoMP and information of UE to attend to CoMP notified from a base station by radio resource control (RRC) signal, and
wherein the transmission mode to support CoMP is Transmission Mode 10 and a downlink control information (DCI)format corresponding to the Transmission Mode 10 comprises DCI format 2D.

10. A radio communication system for configuring coordinated multipoint transmission (CoMP),
wherein a based station notifies a user terminal (UE) of a transmission mode to support CoMP and information of UE to attend to CoMP by radio resource control (RRC) signaling, and
wherein the transmission mode to support CoMP is Transmission Mode 10 and a downlink control information (DCI) format corresponding to the Transmission Mode 10 comprises DCI format 2D.

* * * * *